April 6, 1926.　　　　　　　　　　　　　　　　1,579,512

F. L. BUSHONG

RODENT DESTROYER

Filed Nov. 4, 1924

Inventor
F. L. Bushong.
By R. H. Fravel
Attorney

Patented Apr. 6, 1926.

1,579,512

UNITED STATES PATENT OFFICE.

FRANK LEE BUSHONG, OF CHARLES TOWN, WEST VIRGINIA.

RODENT DESTROYER.

Application filed November 4, 1924. Serial No. 747,845.

*To all whom it may concern:*

Be it known that I, FRANK L. BUSHONG, a citizen of the United States, residing at Charles Town, in the county of Jefferson and State of West Virginia, have invented certain new and useful Improvements in Rodent Destroyers, of which the following is a specification.

The present invention relates to rodent destroyers, and is designed to hold a poison or poisoned food in a position accessible to the animals to be destroyed and out of reach of other animals, fowls, and the like.

Objects of the invention are the provision of a device of this character which can be used as a container for poison or poisoned food, which will rest in stable equilibrium on the ground without additional supporting structure, will prevent the poisoned food from spilling out upon the ground, will afford easy access to said food, and which at the same time will preserve the poisoned food contained therein in a dry and effective condition.

Other objects are simplicity of construction, durability and cheapness of manufacture.

Still another object is to so construct the container as to permit the passage of rodents going and coming at the same time to and from the bait.

The embodiment of applicant's invention shown on the accompanying drawing is designed for the extermination of the common field mouse which is so injurious to orchards and other growing plants, although it may be used to destroy rats, squirrels and other animals of like nature. The device is not designed as a trap but merely as a holder for poison or poisoned food and is made of glass or other suitable material.

Bait holders of this character in order to be effective, must allow the ready escape of the animal after he has eaten of the poisoned food, in order that the destruction of these pests may be continuous.

Each holder constitutes a poison station to which mice and the like may resort and from which they may depart at will after eating of the poison, with the result that the passage way to the bait remains unstopped. The holder is preferably made of glass or other transparent material so that rodents may see the bait in approaching from all directions and in order that an attendant may observe the condition of the bait without dislodging the holder from its position on the ground.

In the drawings which represent one embodiment of the invention,

Figure 1:
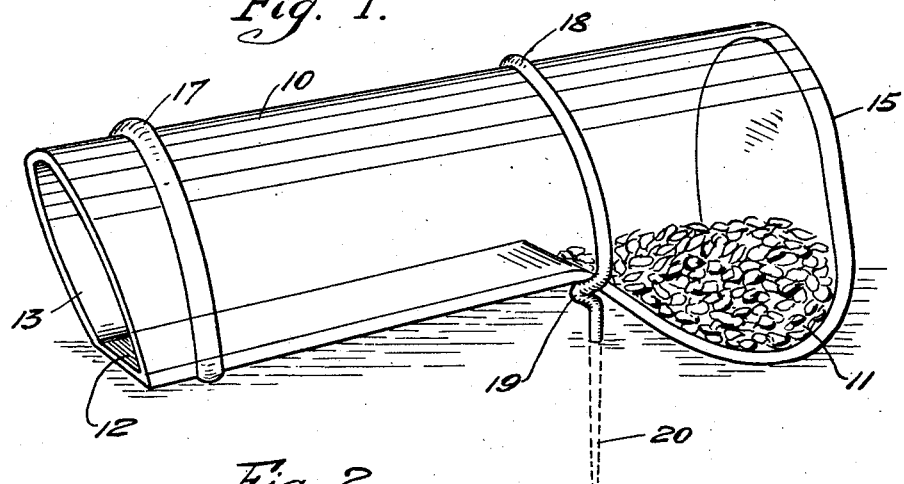
Figure 1 is a perspective view of the bait holder on an enlarged scale, showing the same anchored in position with poisoned food in the containing cup or pocket.
Figure 2:
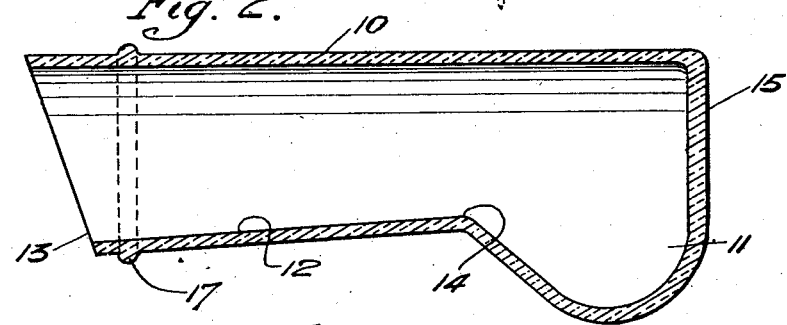
Fig. 2 is a longitudinal sectional view of the bait holder on a reduced scale.
Figure 3:
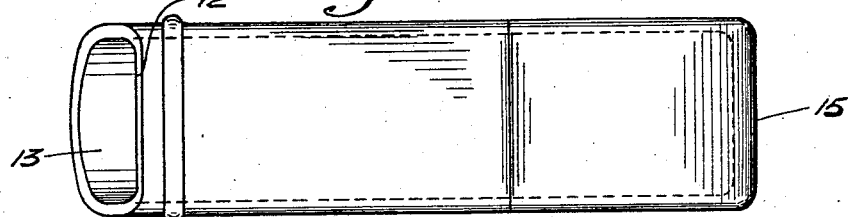
Fig. 3 is a bottom plan view.
Figure 4:
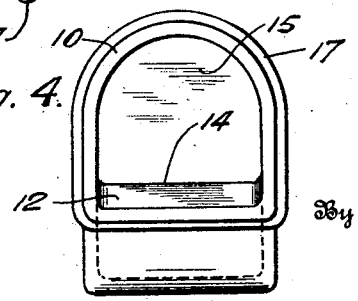
Fig. 4 is a front elevation.

Referring to the drawings in detail by reference numerals, the same numerals designating the same parts in all views, 10 is a tubular passageway having a bait pocket 11 formed at the rear end thereof. The passageway is constructed with a flat bottom 12 constituting a runway which slopes gradually upward from the entrance opening 13, at the front end of the device to a ridge 14 constituting the divide between the runway and the pocket. The bottom of the pocket slopes rearwardly downward abruptly from this line as compared with the slope of the runway, to form the pocket; at the same time not sufficiently abrupt to form an easily breakable shoulder or bend. The bottom of the pocket is rounded to further avoid liability to breakage and bends rearwardly upward from its lowermost point merging in the rear wall 15 which closes that end of the holder. The pocket is not spherical in shape but constitutes in general a semi-cylinder having its axis lying transversely to the axis of the passageway, so that when the device is placed on the ground, it may rest on the bead 17 extending transversely across the bottom of the runway near the front end and on the lowermost part of the pocket, in stable equilibrium, without the assistance of any auxiliary device, and owing to the weight of the material of which it is made cannot be overturned or dislodged from the position in which it was set, by small animals, as chickens, cats and the like.

To further insure the device against dislodgment, a wicket 18 may be provided having crimps 19 formed therein and adapted to be sprung under the bottom of the holder at the division between the runway and pocket. This wicket is provided at its ends with prongs 20 adapted to be projected into the ground.

As indicated above the preferred embodiment of the present invention is made of glass and its simplicity of construction insures cheapness of manufacture, and reduces the liability to breakage in shipment and in use. The device is free of all abrupt projections or constrictions and may be blown in a single operation. It provides a gradual flat slope to the runway permitting the animals to pass each other in the passageway, and the interior is free of all obstructions that would hinder or discourage an animal in its ingress or egress. By virtue of the fact that the device is adapted to rest flat on the ground with the runway sloping upward, danger of fowls and animals larger than those for which the bait is being set being able to obtain access to the bait, is eliminated. It also insures against their being able to tilt the holder to any position in which such access can be obtained. The slope of the runway also prevents water from coming into contact with the bait, thereby spoiling the same and rendering it ineffective.

Having described the invention what is claimed is:

1. An animal exterminator consisting of a tubular passageway open at one end and closed at the other having a flat sloping bottom constituting a runway and a bait pocket communicating with the passageway at the upper end of the runway.

2. An animal exterminator, consisting of a tubular transparent passageway open at one end and closed at the other, said passageway having a flat gradually upwardly sloping bottom constituting a runway, a bait pocket communicating with said passageway at the upper end of said runway.

3. An animal exterminator, consisting of a tubular transparent passageway open at one end and closed at the other, said passageway having a flat gradually upwardly sloping bottom constituting a runway, a bait pocket communicating with said passageway at the upper end of said runway, said pocket being substantially semi-cylindrical in shape and having its axis lying at right angles to the axis of the passageway.

4. An animal exterminator consisting of a tubular passageway open at one end and closed at the other, said passageway having a flat bottom constituting a runway, a bulge at the closed end of the passageway, the walls of which slope gradually from the bottom of the passageway, said bulge being substantially semi-cylindrical in shape and having its axis at right angles to the axis of the passageway, a rib on the bottom of the passageway in parallelism with said axis, said rib and the bottom of the pocket being adapted to support the holder in stable equilibrium with the runway gradually sloping upward.

In testimony whereof I affix my signature.

FRANK LEE BUSHONG.